(12) United States Patent
Vyas et al.

(10) Patent No.: US 11,656,855 B2
(45) Date of Patent: May 23, 2023

(54) IDENTIFY, SUGGEST, AND AUTO-IMPLEMENT BEST PRACTICES FOR REQUIREMENT SPECIFIC SOFTWARE DEVELOPMENT

(71) Applicant: International Business Machines Corporation, Armonk, NY (US)

(72) Inventors: Anvita Vyas, Deori (IN); Namit Kabra, Hyderabad (IN); Saranga dhar Tripathy, Hyderabad (IN); Tarun Tater, Nagaur (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/346,420

(22) Filed: Jun. 14, 2021

(65) Prior Publication Data
US 2022/0398075 A1 Dec. 15, 2022

(51) Int. Cl.
*G06F 8/41* (2018.01)
*G06F 11/36* (2006.01)
*G06F 8/77* (2018.01)

(52) U.S. Cl.
CPC .......... *G06F 8/443* (2013.01); *G06F 8/77* (2013.01); *G06F 11/3688* (2013.01)

(58) Field of Classification Search
CPC ......... G06F 8/443; G06F 8/77; G06F 11/3688
See application file for complete search history.

(56) References Cited

U.S. PATENT DOCUMENTS

| | | |
|---|---|---|
| 6,596,030 B2 | 7/2003 | Ball et al. |
| 6,876,314 B1 | 4/2005 | Lin |
| 9,454,351 B2 | 9/2016 | Anderson |
| 2006/0123022 A1 | 6/2006 | Bird et al. |
| 2009/0125878 A1 | 5/2009 | Cullum |
| 2017/0371629 A1* | 12/2017 | Chacko ............... G06F 8/36 |
| 2019/0079752 A1* | 3/2019 | Makkar ............... G06F 8/443 |
| 2019/0079754 A1 | 3/2019 | Makkar |
| 2019/0325348 A1* | 10/2019 | Carranza ............ G06K 9/6253 |
| 2020/0192638 A1* | 6/2020 | Pezaris ............... G06F 8/73 |
| 2021/0081196 A1* | 3/2021 | Polleri ............... H04L 9/0894 |

(Continued)

OTHER PUBLICATIONS

Chen et al., "Constructing Adaptive Software in Distributed Systems," Proceedings of the 21st International Conference on Distributed Computing Systems, Phoenix, AZ, Apr. 2001, 9 pages.

(Continued)

*Primary Examiner* — Wei Y Zhen
*Assistant Examiner* — Amir Soltanzadeh
(74) *Attorney, Agent, or Firm* — VanLeeuwen & VanLeeuwen; Matthew C. Zehrer

(57) ABSTRACT

An approach is disclosed that receives a code segment from a source code file. The received code segment is inputted to a trained knowledge manager from which one or more comparable code segments are received. Each of the comparable code segments are identified as having similar functionality as the selected code segment and each of the comparable code segments has a set of metadata. The metadata is used to select one of the comparable code segments and this selected code segment is used to replace the original code segment in the source code file.

11 Claims, 6 Drawing Sheets

(56) References Cited

U.S. PATENT DOCUMENTS

2022/0012021 A1* 1/2022 Abhinav ............... G06F 9/453
2022/0058196 A1* 2/2022 Stoafer ............... G06F 9/4881

OTHER PUBLICATIONS

Kulkarni et al., "Correctness of Component-Based Adaptation," 7th International Symposium Component-Based Software Engineering, May 2004, 8 pages.

"How to configure a production-grade CI-CD workflow for infrastructure code," Gruntwork.io, Feb. 2021, 37 pages.

Zhang et al., "Model-based development of dynamically adaptive software," International Conference on Software Engineering (ICSE'06), May 2006, Shanghai, China, 11 pages.

Hasselt et al., "Deep Reinforcement Learning with Double Q-learning," Association for the Advancement of Artificial Intelligence, 2016, 13 pages.

Vigueras et al., "Towards Automatic Learning of Heuristics for Mechanical Transformations of Procedural Code," Program Transformation for Programmability in Heterogeneous Architectures, PROHA'16, Mar. 12, 2016, Barcelona, Spain, 9 pages.

"Analyzing PyPI package downloads," Python Packaging User Guide, Feb. 2021, 6 pages.

Inzinger et al., "Model-based Adaptation of Cloud Computing Applications," 1st international workshop on mobile data analytics Conference Paper, Feb. 2013, 6 pages.

Williams, "Simple Statistical Gradient-Following Algorithms for Connectionist Reinforcement Learning," Machine Learning, 8, 229-256 (1992), 28 pages.

Ferry et al., "Towards model-driven provisioning, deployment, monitoring, and adaptation of multi-cloud systems," CLOUD 2013: 6th IEEE International Conference on Cloud Computing, Jun. 2013, Santa Clara, CA, USA, pp. 887-894.

* cited by examiner

IDENTIFY, SUGGEST, AND AUTO-IMPLEMENT BEST PRACTICES FOR REQUIREMENT SPECIFIC SOFTWARE DEVELOPMENT

BACKGROUND

The best practices for an application or software depend on many factors arising from the functional and non-functional requirements as well as the computing environment in which it is going to be deployed. The requirements can vary across different factors such as speed, space efficiency, streaming data related, multithreading, and the like. To cater to these requirements, factors such as security (e.g., vulnerabilities, etc.), maintained libraries/packages for future maintenance, environment related (docker/linux/compatibility with other libraries/packages), multi-tenancy, multiple users, version related factors, and the like are also addressed. Because of the complexity, a developer may create or use code segments, such as external functions, etc., that are not well suited to the application or software at hand. Oftentimes, the developer selects such ill-suited code segments because of a developer's knowledge of such code segment and a lack of knowledge of other functionally equivalent code segments that are better suited to the software being developed.

SUMMARY

An approach is disclosed that receives a code segment from a source code file. The received code segment is inputted to a trained knowledge manager from which one or more comparable code segments are received. Each of the comparable code segments are identified as having similar functionality as the selected code segment and each of the comparable code segments has a set of metadata. The metadata is used to select one of the comparable code segments and this selected code segment is used to replace the original code segment in the source code file.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
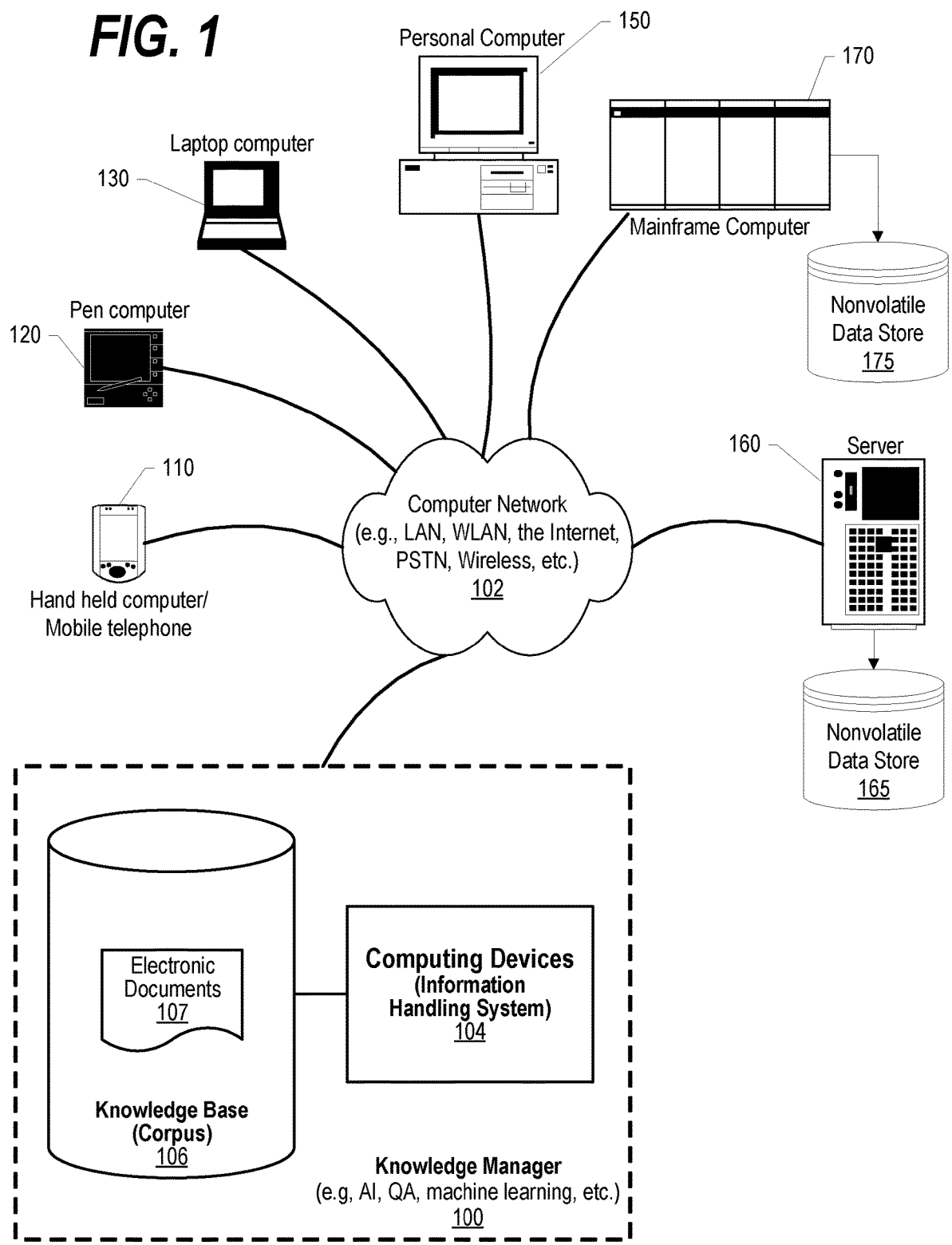
FIG. 1 depicts a network environment that includes a knowledge manager that utilizes a knowledge base.

FIGS. 1-6 describe a cognitively smart system with auto-adapting capabilities customised automatically with respect to deployment infrastructure changes. The approach operates by performing the following steps. The approach automatically builds hooks for customisation by generating variations of code blocks. This is performed by identifying code segments such as library functions that can be implemented in a different fashion. The approach truncates the available comparable code segments based on feasibility. The approach analyzes metadata to understand environmental factors and more important coding attributes from documents and the code to identify important comparable code segments. This helps to reduce the possible counts of all permutation of code variations. The approach then truncates the possible comparable code segments by analyzing one or more metrics related to parameters such as speed, memory, security vulnerabilities, environment, etc., with such parameters found to be important in the development of the source code. The approach builds these hooks and identifies possible alternatives for a code block by extracting similar functional libraries from a trained knowledge base. The approach then runs them through a deep learning architecture to generate a syntactically correct code snippet using a reinforcement learning engine. The approach then checks for the functionality by using the test suites and stores the variations with their combined scores according to different metrics and flags as to which variation is better suited for which environment. The approach learns and tunes the learning module based on feedback from developers by adequately giving positive and negative rewards. From the governance standpoint, the approach also keeps track of which code path was taken in case of any failures so that the issues can be resolved adequately and expeditiously.

The approach is focused on auto-adapting app-capabilities based on deployment infrastructure changes with the following objectives. First, the approach predicts possible highly to-occur deployment changes in the app context and enable adapter-hooks only for these discovered context-change combinations. This allows applications to auto-adapt its capability based on predicted deployment change contexts which makes the approach scalable and reduces the size of the generated app. For example, in banking apps, there is little requirement to reduce imposed security constraints. So, enabling hooks that would reduce security constraints is not useful in this context, so the approach avoids such comparable code segments that would reduce the security.

Second, the approach identifies the best comparable code segment for various deployment changes via crowd-sourced re-enforcement learning (RL) reward collection mechanism. Knowledge of comparable code segments is reflected in such code segments' metadata which is ingested into the trained knowledge manager. Using this knowledge, the approach compares the expected improvement with the actual improvement to derive positive and negative reward scores. The knowledge base related to code segments improves over time as more users provide feedback (metadata) that is used to continually teach the knowledge manager (enhanced learning). The approach can also auto-add the identified "best" comparable code segments by predicting the possible deployment context changes.

Consider the following code transformation example. The possible code transformations can be shown with a combined report according to different parameters which are important for a particular application given the requirements. For example, if the requirements say that program "speed" is an important factor with the following code segment being found in the original source code file:

Original code segment:
Scanner scn=new Scanner(System.in);
System.out.println("Enter a String");
String b=scn.nextLine( );

Analysis of metadata corresponding to the original code segment reveals that the code segment is relatively slow, but uses a small amount of memory space.

The approach analyzes the original segment and identifies a comparable code segment in the knowledge base with the comparable code segment reading as follows:

Comparable code segment:
BufferedReader br=new BufferedReader(new InputStream Reader(System.in));
String b=br.readLine( );

The approach analyzes metadata corresponding to the identified comparable code segment which reveals that the comparable code segment is faster than the original code segment, but uses a larger buffer memory. Because speed was noted as being more important than memory space usage, the comparable code segment is selected by the approach and replaces the original code segment in the source code file.

The approach uses an exhaustive list of functions and libraries which can be searched and used as alternatives for a particular functionality. In one embodiment, the knowledge base is built by crawling the corresponding language/framework web pages of available projects. The approach creates the knowledge base and includes metadata regarding the various code segments ingested ("learned") by the knowledge manager.

Because libraries can be very specific to a particular task, the approach also creates a list of available functions with their function signature and description. Once the descriptions of comparable code segments are stored in the knowledge base, the approach mines the available data, such as opened and closed issues, for any information about non-functional requirements such as security vulnerabilities, compatibility with different versions etc. This metadata is then used by the approach to identifying the best alternative comparable code segments depending on the requirements of the application.

The approach further identifies comparable code blocks that can be customized or substituted for another code block. The approach maintains an exhaustive knowledge base of existing libraries and their functionalities for a particular language/framework. Whenever code is being written, in one embodiment, the approach runs in the background and checks whenever a function call is being invoked to identify comparable code segments.

The approach keeps a running list of all the code segments (e.g., library functions, etc.) being used by the developer in a source code file. This can be done by parsing the source file for all import statements. Once the code segments (e.g., libraries from import statements) are identified, the approach can list all the source code segments (e.g., functions, etc.) in the source file. Then, the list of code segments can be analyzed for comparable code segments that might be used as replacements.

Once different code segments are identified as having possible alternatives, the approach generates code transformations based on the issues recognized by analyzing the metadata. The code transformations are checked against already present unit-tests to make sure the functionality of a module is still intact.

The system maintains a generic pool of dockers for different versions of pre-defined frameworks of comparable code segments. After a ranked list of code transformations is generated, the system selects a set of comparable code segments based on the framework/language used in the code or from a gathered set of metadata. The metadata, such as dependencies, can be gathered from requirements data, package data, and the like depending on the underlying language and frameworks are then installed for automated testing.

The approach then tests the transformations in optimal sequence as suggested by the tool according to the requirements. The approach may try multiple related code transformations. After each set of the code transformations is generated, the system tries a fresh build in the development environment (e.g., docker, etc.) with all the tests and results available. If a particular code transformation works, the ranking can be updated and the user is given a ranked list of possible code transformations. Whenever there is a successful build using comparable code segments, the approach can try different transformations and generate a report for each different transformation with its corresponding score and perform a build process. In one embodiment, for each successful transformation and build, the builds are tagged as "validation pending". So, there can be multiple builds which would be "validation pending" state. Once the developer validates the build, the developer can approve the build and change the tag to "production build".

FIG. 1 depicts a schematic diagram of one illustrative embodiment of knowledge manager (KM) system 100 in a computer network 102. KM system 100 includes a knowledge manager computing device 104 (comprising one or more processors and one or more memories, and potentially any other computing device elements generally known in the art including buses, storage devices, communication interfaces, and the like) that connects KM system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. KM system 100 and network 102 may enable functionality, such as question/answer (QA) generation functionality, for one or more content users. Other embodiments of KM system 100 may be used with components, systems, sub-systems, and/or devices other than those that are depicted herein.

KM system 100 maintains knowledge base 106, also known as a "corpus," which is a store of information or data that the KM system draws on to solve problems. This knowledge base includes underlying sets of facts, assumptions, models, and rules which the KM system has available in order to solve problems.

KM system 100 may be configured to receive inputs from various sources. For example, KM system 100 may receive input from the network 102, a corpus of electronic documents 107 or other data, a content creator, content users, and other possible sources of input. In one embodiment, some or all of the inputs to KM system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with KM system 100. Electronic documents 107 may include any file, text, article, or source of data for use in KM system 100. Content users may access KM system 100 via a network connection or an Internet connection to the network 102, and, in one embodiment, may input questions to KM system 100 that may be answered by the content in the corpus of data. As further described below, when a process evaluates a given section of a document for semantic content, the process can use a variety of conventions to query it from the knowledge manager.

In a question/answering (QA) embodiment of a KM system, one convention is to send a well-formed question to the QA system. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. KM system 100 may interpret the question and provide a response to the content user containing one or more answers to the question. In some embodiments, KM system 100 may provide a response to users in a ranked list of answers.

In some illustrative embodiments, KM system 100 may be the IBM Watson™ question/answering (QA) system available from International Business Machines Corporation of Armonk, New York, which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize KM system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
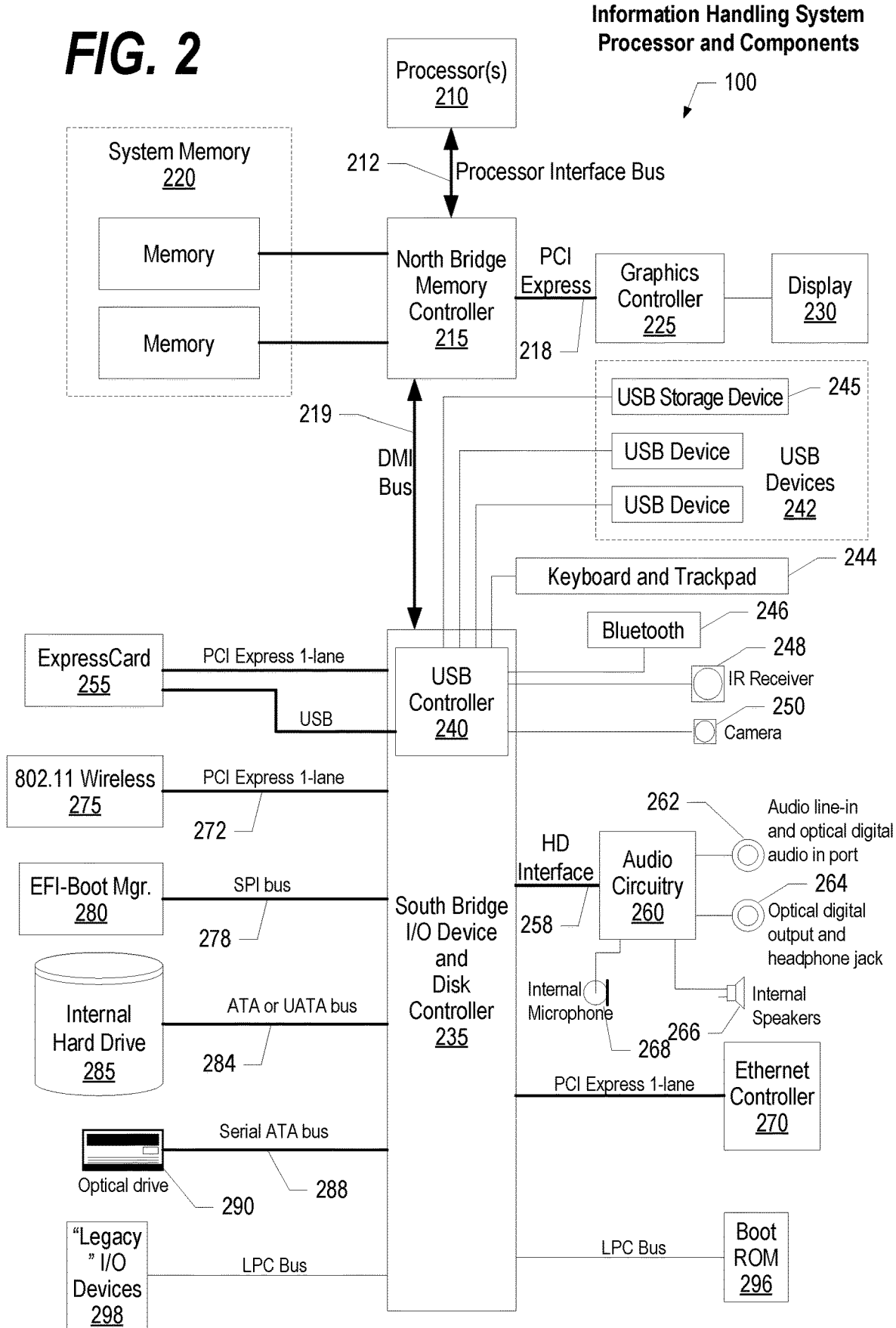
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
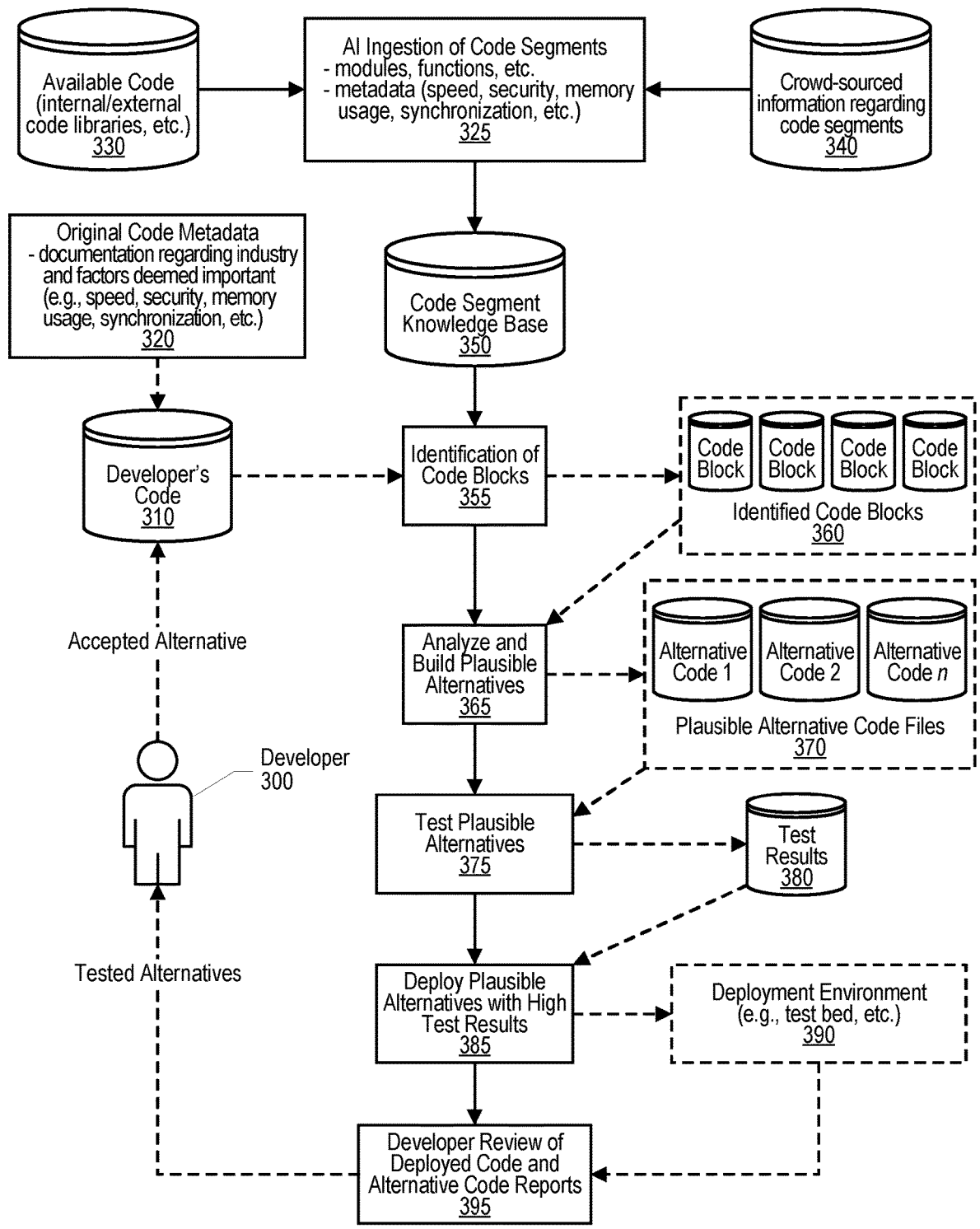
FIG. 3 is a component diagram that shows various components and interactions to identify, suggest, and auto-implement software development best practices.

FIG. 3 is a component diagram that shows various components and interactions to identify, suggest, and auto-implement software development best practices. Developer 300 prepares source code file 310 that includes a variety of code segments. Original code metadata 320 includes documentation regarding the code being developed (e.g., specifications, comments, other documents, etc.) as well as attributes deemed important to the code, such as speed, security, memory usage, synchronization, and the like.

Prior to running the approach to identify suitable code segments, the knowledge manager is trained. During KM training step 325, the knowledge manager (AI, QA system, etc.) ingests code segments and metadata so that the knowledge manager can utilize knowledge base 350. Ingestion, or learning, of code segments includes both the ingestion of available code segments 330, such as those in open source repositories, internal repositories, and the like. In addition, metadata 340 regarding the code segments is also ingested with the metadata including crowd-sourced information regarding the code segments (e.g., ratings and reviews on the code segments with respect to various attributes such as speed, security, memory usage, synchronization, and the like). The ingestion and training performed at step 325 forms trained knowledge base 350 that is used by the knowledge manager to identify the code segments found in original source file 310 as well as comparable code segments that were ingested from available code sources 330.

At step 355, the process identifies code segments from those code segments that are included in source code 310 that are known to the knowledge manager. These identified code segments are stored in data stores 360 for further analysis.

At step 365, the process analyzes the identified code segments and utilizes the knowledge manager to find comparable code segments that are identified as having similar functionality as the identified code segment from the source code file. In one embodiment, comparable code segments that have attributes worse than the original source code segment are discarded. For example, if speed is found to be an important attribute of the code being developed and the original code segment is found to be of "average" speed, then comparable code segments with similar functionality with superior speeds would be retained in data stores 370 for further testing, while comparable code segments with metadata indicating that they are slower than the original source code segment would be discarded and not retained in data stores 370.

At step 375, the process tests the plausible alternative (comparable code segments) stored in data stores 370 by replacing the original source code with the comparable code segment. Replacement of the original source code segment with the comparable code segment includes changing any variable names in the comparable code segment with the variable names that were found in the original code segment. In one embodiment, a "sanity" test is performed after replacement by compiling and attempting to execute the code after the code segment replacement has been performed. Results of this testing are stored in data store 380. Various alternatives can result from trying different combinations of comparable code segments as alternatives (replacements) for original code segments. Each of these various alternatives can be tested with test results retained and available for further review.

At step 385, the process deploys alternatives with high test results in test deployment environment 390. At step 395, the alternative code executing in the deployment environment can be tested and reviewed by developer 300. An alternative code file that is executed in the deployment environment and found by the developer to be better than the original source code file can be chosen as an accepted alternative, thus replacing original source code file 310 with the alternative code file that include code segment replacements.

Figure 4:
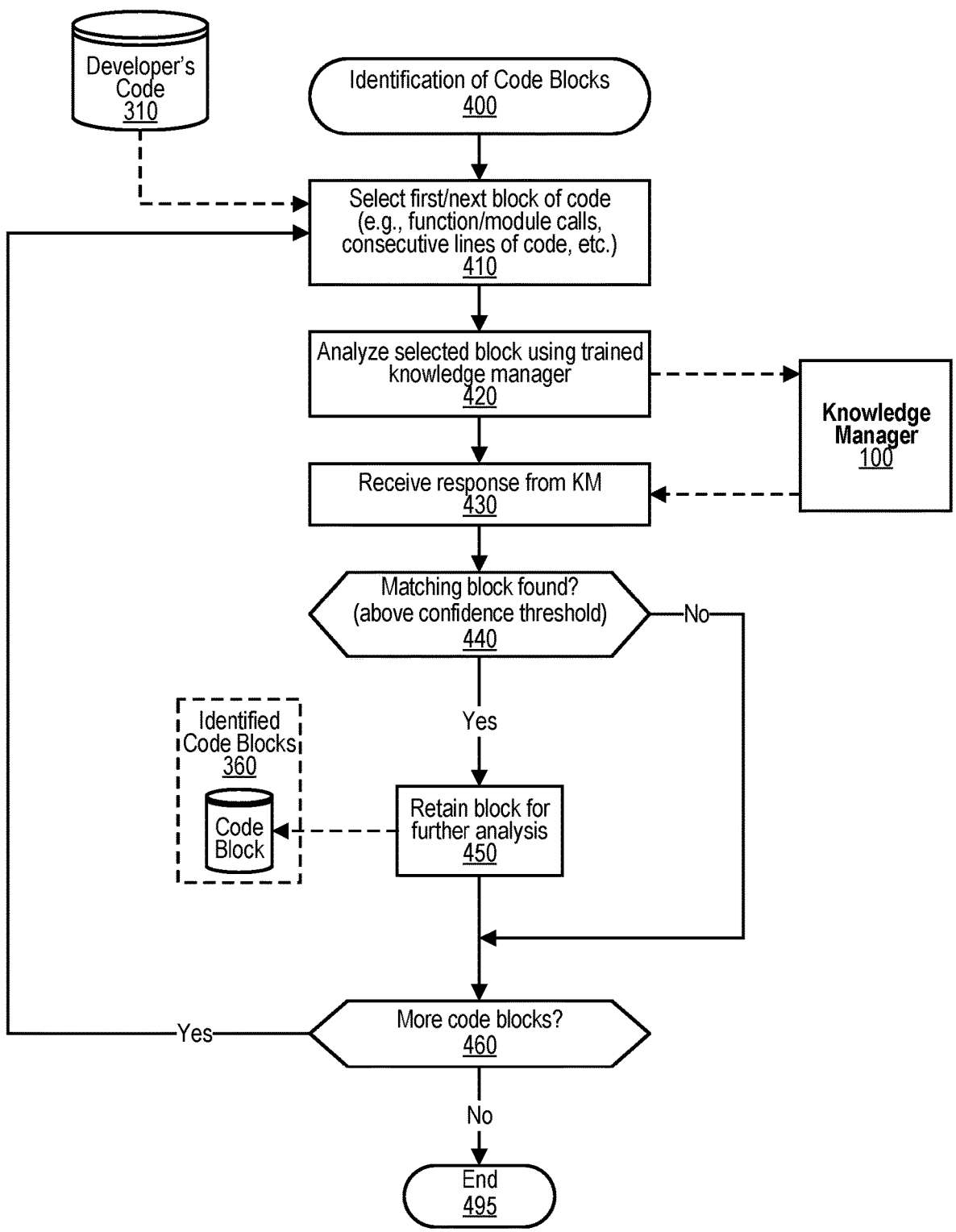
FIG. 4 is a depiction of a flowchart showing the logic used to identify code blocks within a source code file for possible automatic replacement.

FIG. 4 is a depiction of a flowchart showing the logic used to identify code blocks within a source code file for possible automatic replacement. FIG. 4 processing commences at 400 and shows the steps taken by a process that identifies code segments in a source code file. At step 410, the process selects the first code segment (e.g., function/module calls, consecutive lines of code, etc.) from source code file 310. At step 420, the process analyzes the selected code segment using trained knowledge manager 100. The selected code segment is input to the knowledge manager. The trained knowledge manager compares the selected code segment to other code segments in the knowledge manager's knowledge base.

Figure 5:
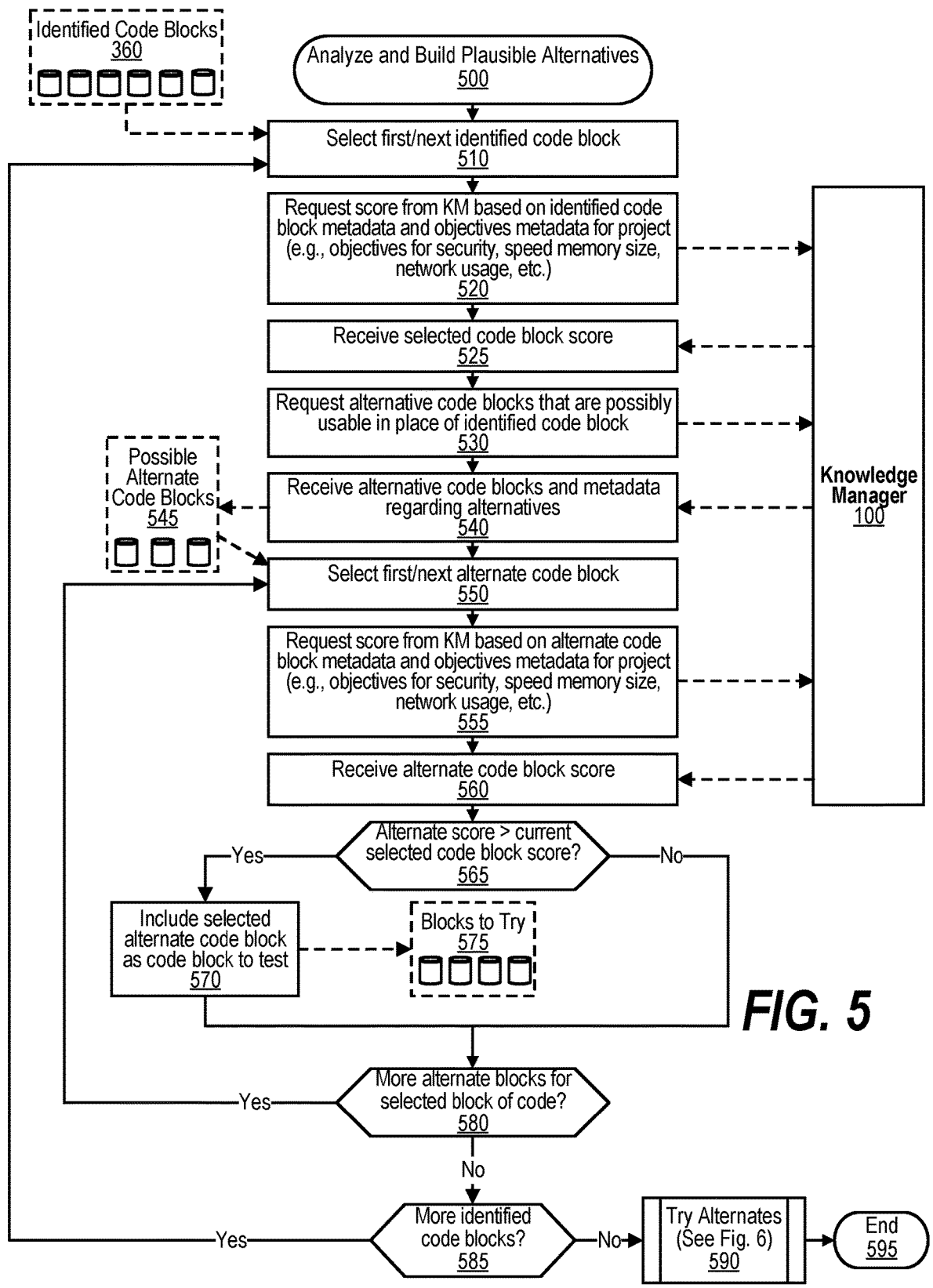
FIG. 5 is a depiction of a flowchart showing the logic used to analyze comparable code segments and associated metadata provided by a knowledge manager.

At step 430, the process receives a response from the knowledge manager indicating whether the selected code segment is "known" to the knowledge manager (KM being previously trained for the code segment). The process determines whether the knowledge manager identified a matching code segment in the KM's knowledge base (decision 440). If a matching code segment was found, then decision 440 branches to the 'yes' branch whereupon, at step 450, the selected block is retained in data store 360 for further analysis as shown in FIG. 5. On the other hand, if a matching code segment was not found in the knowledge base, then decision 440 branches to the 'no' branch bypassing step 450.

The process determines whether there are more code segments in the source code file to select and process as described above (decision 460). If there are more code segments, then decision 460 branches to the 'yes' branch which loops back to step 410 to select and process the next code segment from source code file 310 as described above. This looping continues until all of the code segments have been processed, at which point decision 460 branches to the 'no' branch exiting the loop. Processing to identify code segments in the source code thereafter ends at 495.

FIG. 5 is a depiction of a flowchart showing the logic used to analyze comparable code segments and associated metadata provided by a knowledge manager. FIG. 5 processing commences at 500 and shows the steps taken by a process that analyzes and build plausible alternatives using comparable code segments. At step 510, the process selects the first identified code segment from data store 360. At step 520, the process requests a score from knowledge manager 100 based on the identified code segment metadata and the objectives metadata for the software project, such as objectives for security, speed, memory size, network usage, and the like. At step 525, the process receives the selected code segment score from the knowledge manager.

At step 530, the process requests, from the knowledge manager, alternative code segments that are possibly usable in place of identified code segment. At step 540, the process receives the alternative comparable code segments and metadata regarding these alternatives. The possible alternative code segments are stored in data store 545.

At step 550, the process selects the first comparable code segment from data store 545. At step 555, the process requests a score from the trained knowledge manager based on the comparable code segment's metadata and objectives metadata for the software project (e.g., objectives for security, speed memory size, network usage, etc.). At step 560, the process receives comparable code segment score from the knowledge manager. Here, the process compares the scores of the alternative code segment to the scores of the identified code segment as well as the metadata (scores) for the overall software project. For example, if the overall project has "speed" as an objective and the identified code segment has "average" speed, but the comparable code segment has superior speed, the comparison might favor usage of the comparable code segment.

The process determines as to whether the score of the comparable code segment is better than (e.g., greater than, etc.) the score of the selected code segment (decision 565). If the score of the comparable code segment is better, then decision 565 branches to the 'yes' branch whereupon, at step 570, the selected comparable code segment is included in a set of comparable code segments to try using in the source code and added to data store 575. On the other hand, the score of the comparable code segment is not better, then decision 565 branches to the 'no' branch bypassing step 570.

The process determines as to whether there are more comparable code segments to select and process for the selected identified code segment (decision 580). If there are more comparable code segments to select and process, then decision 580 branches to the 'yes' branch which loops back to step 550 to select and process the next comparable code segment. This looping continues until all of the comparable code segments for the identified code segment have been processed, at which point decision 580 branches to the 'no' branch exiting the loop.

The process determines as to whether there are more identified code segments in data store 360 to process (decision 585). If there are more identified code segments to process, then decision 585 branches to the 'yes' branch which loops back to step 510 to select and process the next identified code segment as described above. This looping continues until all of the identified code segments have been processed, at which point decision 585 branches to the 'no' branch exiting the loop.

Figure 6:
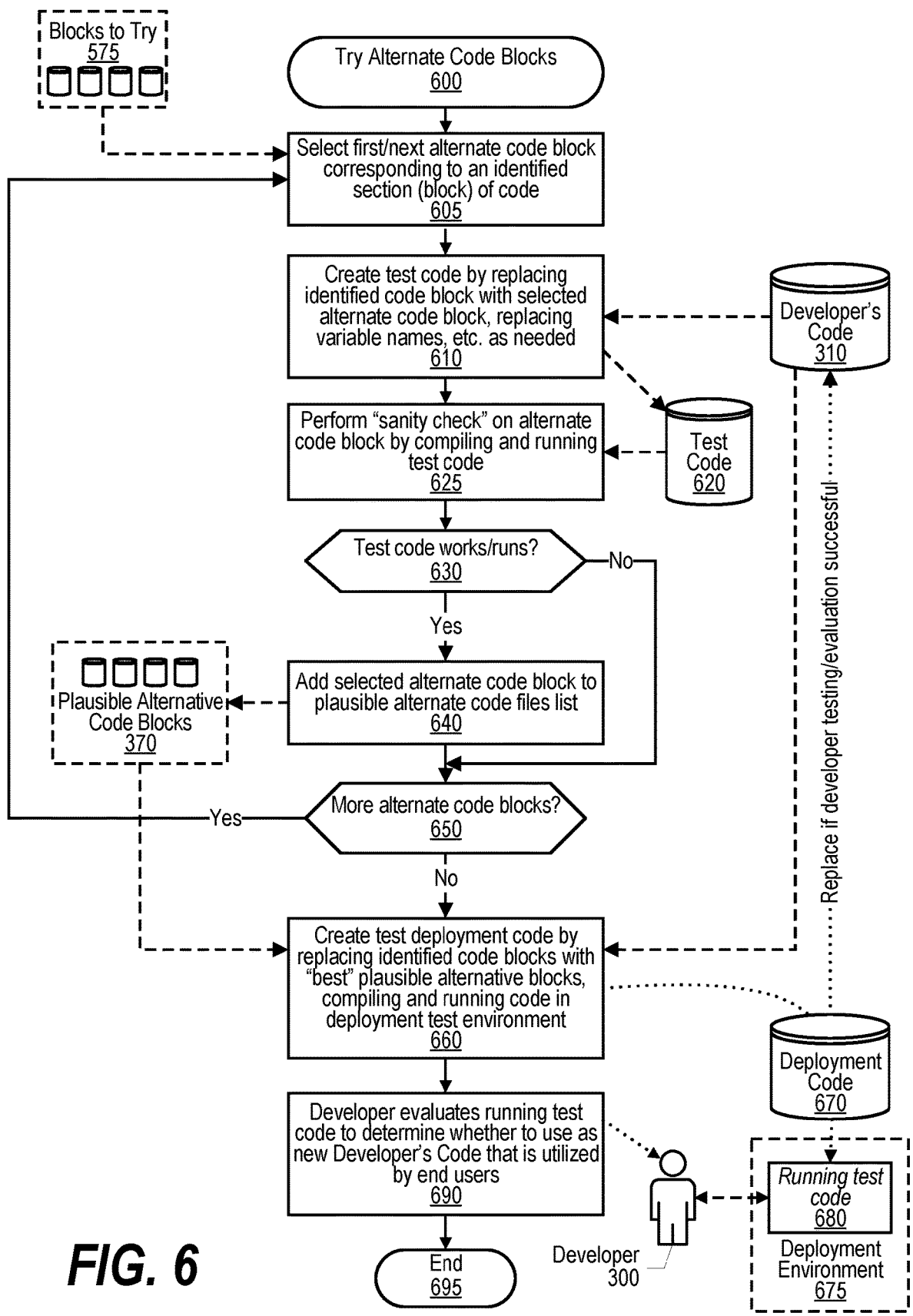
FIG. 6 is a depiction of a flowchart showing the logic used to test alternative code files with one or more comparable code segments replacing corresponding original code segments.

At predefined process 590, the process tries using comparable code segments as plausible replacements for the code segments currently found in the source code (see FIG. 6 and corresponding text for processing details). FIG. 5 processing thereafter ends at 595.

FIG. 6 is a depiction of a flowchart showing the logic used to test alternative code files with one or more comparable code segments replacing corresponding original code segments. FIG. 6 processing commences at 600 and shows the steps taken by a process that tries using comparable code segments in place of identified code segments found in the original source code. At step 605, the process selects the first comparable code segment corresponding to an identified code segment from data store 575.

At step 610, the process creates a test code source file by replacing the identified code segment with the selected comparable code segment. This step further changes variable names in the comparable code segment to match variable names found in the original code segment that is being replaced. The created test code source file is stored in data store 620

At step 625, the process performs a "sanity check" on the comparable code stored in data store 620 by attempting to compile and execute the test code after the code segment has been properly replaced by the comparable code segment. The process determines whether the test code appears to properly execute (decision 630). If the test code appears to properly execute, then decision 630 branches to the 'yes' branch whereupon, at step 640, the process adds the selected comparable code segment to a list of plausible comparable code segments that are stored in data store 370. On the other hand, if the test code does not appear to properly execute, then decision 630 branches to the 'no' branch bypassing step 640.

The process determines as to whether there are more comparable code segments to process (decision 650). If there are more comparable code segments to process, then decision 650 branches to the 'yes' branch which loops back to step 605 to select and process the next comparable code segment that has been identified as a code segment to try using in the source code. This looping continues until all of the comparable code segments have been processed, at which point decision 650 branches to the 'no' branch exiting the loop.

At step 660, the process creates test deployment code by replacing the identified code segments with the "best" plausible alternative segments with the test deployment code being stored in data store 670. This test deployment code is compiled and executed in deployment test environment 675. At step 690, the developers 300 evaluate running test code 680 to determine whether to use the altered test development code as production code 310 that is deployed and utilized by end users. FIG. 6 processing thereafter ends at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method, implemented by an information handling system that includes a processor and a memory, the method comprising:
   receiving a plurality of source code segments that include a selected code segment from a plurality of code segments that are included in a source code file;
   inputting each of the selected code segments to a trained knowledge manager;
   receiving, from the trained knowledge manger, one or more matches and one or more comparable code segments that are each identified as having similar functionality as the selected code segment, wherein each of the comparable code segments has a set of metadata, and wherein each of the matches correspond to one of the plurality of source code segments and indicate that the knowledge manager has training data pertaining to the corresponding source code segments;
   computing a comparable code segment score of each of the received comparable code segments by comparing the metadata of the received comparable code segments to a set of metadata corresponding to the selected code segment;
   identifying, based on the comparable code segment score corresponding to one of the one or more comparable code segments, one of the one or more comparable code segments;
   replacing, in the source code file, the selected code segment with the identified comparable code segment, the replacing resulting in an altered source code file; and
   testing the altered source code file by compiling the altered source code file and executing a result of the compiling.

2. The method of claim 1 further comprising:
   receiving, from the trained knowledge manager, a set of one or more comparable code segments corresponding to each of the source code segments with matches;
   comparing the set of metadata corresponding to the received comparable code segments with a metadata of the corresponding source code segments; and
   determining to replace at least one of the source code segments with one of the comparable code segments based on the comparing.

3. The method of claim 2 further comprising:
   further comparing a metadata of the source code file with the set of metadata corresponding to the received comparable code segments, wherein the determining is further based on the further comparing of the metadata.

4. The method of claim 1 further comprising:
   performing the inputting, receiving, selecting, and replacing corresponding each of the plurality of code segments, wherein more than one received code segments is replaced by the corresponding selected comparable code segments.

5. An information handling system comprising:
   one or more processors;
   a memory coupled to at least one of the processors;
   a network interface that connects the information handling system to one or more remote computer systems; and
   a set of computer program instructions stored in the memory and executed by at least one of the processors in order to perform actions comprising:
      receiving a plurality of source code segments that include a selected code segment from a plurality of code segments that are included in a source code file;
      inputting each of the selected code segments to a trained knowledge manager;
      receiving, from the trained knowledge manger, one or more matches and one or more comparable code segments that are each identified as having similar functionality as the selected code segment, wherein each of the comparable code segments has a set of metadata, and wherein each of the matches correspond to one of the plurality of source code segments and indicate that the knowledge manager has training data pertaining to the corresponding source code segments;
      computing a comparable code segment score of each of the received comparable code segments by comparing the metadata of the received comparable code segments to a set of metadata corresponding to the selected code segment;

identifying, based on the comparable code segment score corresponding to one of the one or more comparable code segments, one of the one or more comparable code segments;

replacing, in the source code file, the selected code segment with the identified comparable code segment, the replacing resulting in an altered source code file; and testing the altered source code file by compiling the altered source code file and executing a result of the compiling.

6. The information handling system of claim 5 wherein the actions further comprise:

receiving, from the trained knowledge manager, a set of one or more comparable code segments corresponding to each of the source code segments with matches;

comparing the set of metadata corresponding to the received comparable code segments with a metadata of the corresponding source code segments; and determining to replace at least one of the source code segments with one of the comparable code segments based on the comparing.

7. The information handling system of claim 6 wherein the actions further comprise:

further comparing a metadata of the source code file with the set of metadata corresponding to the received comparable code segments, wherein the determining is further based on the further comparing of the metadata.

8. The information handling system of claim 5 wherein the actions further comprise:

performing the inputting, receiving, selecting, and replacing corresponding each of the plurality of code segments, wherein more than one received code segments is replaced by the corresponding selected comparable code segments.

9. A computer program product stored in a computer readable storage medium, comprising computer program code that, when executed by an information handling system (a local node), performs actions comprising:

receiving a plurality of source code segments that include a selected code segment from a plurality of code segments that are included in a source code file;

inputting each of the selected code segments to a trained knowledge manager;

receiving, from the trained knowledge manger, one or more matches and one or more comparable code segments that are each identified as having similar functionality as the selected code segment, wherein each of the comparable code segments has a set of metadata, and wherein each of the matches correspond to one of the plurality of source code segments and indicate that the knowledge manager has training data pertaining to the corresponding source code segments;

computing a comparable code segment score of each of the received comparable code segments by comparing the metadata of the received comparable code segments to a set of metadata corresponding to the selected code segment;

identifying, based on the comparable code segment score corresponding to one of the one or more comparable code segments, one of the one or more comparable code segments;

replacing, in the source code file, the selected code segment with the identified comparable code segment, the replacing resulting in an altered source code file; and testing the altered source code file by compiling the altered source code file and executing a result of the compiling.

10. The computer program product of claim 9 wherein the actions further comprise:

receiving, from the trained knowledge manager, a set of one or more comparable code segments corresponding to each of the source code segments with matches;

comparing the set of metadata corresponding to the received comparable code segments with a metadata of the corresponding source code segments; and determining to replace at least one of the source code segments with one of the comparable code segments based on the comparing.

11. The computer program product of claim 9 wherein the actions further comprise:

performing the inputting, receiving, selecting, and replacing corresponding each of the plurality of code segments, wherein more than one received code segments is replaced by the corresponding selected comparable code segments.

* * * * *